United States Patent
Yoshida et al.

(10) Patent No.: US 12,195,691 B2
(45) Date of Patent: Jan. 14, 2025

(54) LUBRICATING OIL ADDITIVE COMPOSITION AND LUBRICATING OIL COMPOSITION

(71) Applicant: IDEMITSU KOSAN CO.,LTD., Tokyo (JP)

(72) Inventors: Yukio Yoshida, Ichihara (JP); Shota Kato, Chiba (JP); Hideto Kamimura, Ichihara (JP)

(73) Assignee: IDEMITSU KOSAN CO.,LTD., Tokyo (JP)

( * ) Notice: Subject to any disclaimer, the term of this patent is extended or adjusted under 35 U.S.C. 154(b) by 15 days.

(21) Appl. No.: 18/256,375

(22) PCT Filed: Dec. 28, 2021

(86) PCT No.: PCT/JP2021/048899
§ 371 (c)(1),
(2) Date: Jun. 7, 2023

(87) PCT Pub. No.: WO2022/145462
PCT Pub. Date: Jul. 7, 2022

(65) Prior Publication Data
US 2024/0026242 A1 Jan. 25, 2024

(30) Foreign Application Priority Data
Dec. 28, 2020 (JP) .................. 2020-219715

(51) Int. Cl.
| | | |
|---|---|---|
| *C10M 145/14* | (2006.01) | |
| *C08F 220/18* | (2006.01) | |
| *C08F 220/20* | (2006.01) | |
| *C08F 230/02* | (2006.01) | |
| *C10M 153/02* | (2006.01) | |
| *C10M 169/04* | (2006.01) | |
| *C10N 20/04* | (2006.01) | |
| *C10N 30/06* | (2006.01) | |
| *C10N 30/08* | (2006.01) | |
| *C10N 40/02* | (2006.01) | |

(52) U.S. Cl.
CPC ..... *C10M 145/14* (2013.01); *C08F 220/1812* (2020.02); *C08F 220/20* (2013.01); *C08F 230/02* (2013.01); *C10M 153/02* (2013.01); *C10M 169/04* (2013.01); *C10M 2209/084* (2013.01); *C10M 2225/02* (2013.01); *C10N 2020/04* (2013.01); *C10N 2030/06* (2013.01); *C10N 2030/08* (2013.01); *C10N 2040/02* (2013.01)

(58) Field of Classification Search
CPC ........... C10M 145/14; C10M 153/02; C10M 169/04; C10M 2209/084; C10M 2225/02; C10M 2201/085; C10M 2203/1025; C10M 2223/04; C10M 2223/041; C08F 220/1812; C08F 220/20; C08F 230/02; C10N 2020/04; C10N 2030/06; C10N 2030/08; C10N 2040/02; C10N 2020/02; C10N 2030/02; C10N 2030/04; C10N 2030/10; C10N 2040/00; C10N 2040/04; C10N 2040/06; C10N 2040/08; C10N 2040/12; C10N 2040/25; C10N 2040/30; C08L 91/00
See application file for complete search history.

(56) References Cited

U.S. PATENT DOCUMENTS

| | | |
|---|---|---|
| 2002/0198284 A1 | 12/2002 | Nakatsuka et al. |
| 2014/0135242 A1 | 5/2014 | Eisenberg et al. |
| 2014/0227534 A1 | 8/2014 | Iwata et al. |
| 2017/0137732 A1* | 5/2017 | Utaka ............ C10L 10/08 |
| 2020/0339903 A1 | 10/2020 | Oki |

FOREIGN PATENT DOCUMENTS

| | | | |
|---|---|---|---|
| JP | 2004-2747 A | 1/2004 | |
| JP | 2014-91767 A | 5/2014 | |
| JP | 2014125570 A * | 7/2014 | |
| JP | 2014-518925 A | 8/2014 | |
| JP | 2018-169368 A | 9/2016 | |
| JP | 2020-26519 A | 2/2020 | |
| WO | WO-0138449 A1 * | 5/2001 | ......... C09J 4/00 |
| WO | WO 2016/043334 A1 | 3/2016 | |
| WO | WO 2019/031404 A1 | 2/2019 | |

OTHER PUBLICATIONS

International Search Report & Written Opinion issued Feb. 22, 2022 in PCT/JP2021/048899, citing documents 2-4 & 17-21 therein (with English translation), 11 pages.
Extended European Extended Search Report issued Mar. 21, 2024 in European Application No. 21915320.2, citing document Nos. 1 and 15-16, therein, 8 pgs.

* cited by examiner

*Primary Examiner* — Taiwo Oladapo
(74) *Attorney, Agent, or Firm* — Oblon, McClelland, Maier & Neustadt, L.L.P.

(57) ABSTRACT

A lubricating oil additive composition that is suitable as a load bearing additive, and is excellent in wear resistance, extreme pressure property, and thermal stability, and a lubricating oil composition containing the lubricating oil additive composition. A lubricating oil additive composition containing a poly(meth)acrylate-based copolymer (X) containing a structural unit (a) derived from a particular alkyl (meth)acrylate (A), a structural unit (b) derived from a particular hydroxy group containing (meth)acrylate (B), and a structural unit (c) derived from a particular phosphorus-containing (meth)acrylate (C).

14 Claims, No Drawings

LUBRICATING OIL ADDITIVE COMPOSITION AND LUBRICATING OIL COMPOSITION

CROSS REFERENCE TO RELATED APPLICATIONS

This application is a National Stage entry under 35 U.S.C. § 371 of PCT/JP2021/048899, filed on Dec. 28, 2021, and claims priority to Japanese Patent Application No. 2020-219715, filed on Dec. 28, 2020, the entire contents of which are incorporated herein by reference.

TECHNICAL FIELD

The present invention relates to a lubricating oil additive composition and a lubricating oil composition containing the lubricating oil additive composition.

BACKGROUND ART

A lubricating oil is blended with various lubricating oil additives for the purposes of imparting and strengthening the properties and capabilities necessary for the lubricating oil.

One example of the representative lubricating oil additives is a load bearing additive imparting wear resistance and extreme pressure property to a lubricating oil. Examples of the load bearing additive generally used include low molecular weight phosphorus-based compounds, such as a phosphate ester compound, a phosphite ester compound, and a phosphonate ester compound.

However, the low molecular weight phosphorus-based compounds can impart excellent wear resistance and extreme pressure property to a lubricating oil, but many of them are poor in thermal stability. Furthermore, some of the low molecular weight phosphorus-based compounds are excellent in thermal stability, but these compounds are often inferior in wear resistance and extreme pressure property.

Under the circumstances, in recent years, investigations on polymer-based compounds have been variously made as a load bearing additive replacing the low molecular weight phosphorus-based compounds (see PTLs 1 and 2).

CITATION LIST

Patent Literatures

PTL 1: JP 2004-2747 A
PTL 2: JP 2014-518925 A

SUMMARY OF INVENTION

Technical Problem

However, the polymer-based compounds having been investigated as a load bearing additive are often insufficient in wear resistance and extreme pressure property as compared to the low molecular weight phosphorus-based compounds, and are often still inferior in thermal stability.

Under the circumstances, a problem to be solved by the present invention is to provide a lubricating oil additive composition that is suitable as a load bearing additive, and is excellent in wear resistance, extreme pressure property, and thermal stability, and a lubricating oil composition containing the lubricating oil additive composition.

Solution to Problem

The present inventors have made earnest investigations for solving the problem. As a result, it has been found that the problem can be solved by a poly(meth)acrylate-based copolymer containing structural units derived from plural particular monomers, and thus the present invention has been completed.

Specifically, the present invention relates to the following items [1] to [4]

[1] A lubricating oil additive composition containing a poly(meth)acrylate-based copolymer (X) containing a structural unit (a) derived from an alkyl (meth)acrylate (A) represented by the following general formula (a-1), a structural unit (b) derived from a hydroxy group-containing (meth)acrylate (B) represented by the following general formula (b-1), and a structural unit (c) derived from a phosphorus-containing (meth)acrylate (C) represented by the following general formula (c-1):

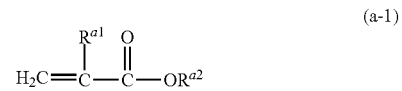

wherein in the general formula (a-1), $R^{a1}$ represents a hydrogen atom or a methyl group; and $R^{a2}$ represents an alkyl group having 8 to 20 carbon atoms,

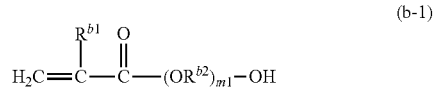

wherein in the general formula (b-1), $R^{b1}$ represents a hydrogen atom or a methyl group; $R^{b2}$ represents an alkylene group having 2 to 4 carbon atoms; and m1 represents an integer of 1 to 10, in which in the case where m1 represents an integer of 2 or more, plural groups represented by $R^{b2}$ may be the same as or different from each other,

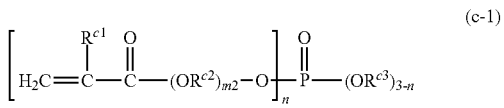

wherein in the general formula (c-1), $R^{c1}$ represents a hydrogen atom or a methyl group; $R^{c2}$ represents an ethylene group; m2 represents an integer of 1 to 6, in which in the case where m2 represents an integer of 2 or more, plural groups represented by $R^{c2}$ may be the same as or different from each other; n represents an integer of 1 or 2; and in the case where n=1, at least one of plural groups represented by $R^{c3}$ is a hydrogen atom, and in the case where n=2, $R^{c3}$ represents a hydrogen atom.

[2] A use method including using the lubricating oil additive composition according to the item [1] as a load bearing additive.

[3] A lubricating oil composition containing the lubricating oil additive composition according to the item [1] and a lubricant base oil.

[4] A method for producing a lubricating oil additive composition, including a step (S) of producing a poly(meth)acrylate-based copolymer (X) by polymerizing an alkyl (meth)acrylate (A) represented by the following general formula (a-1), a hydroxy group-containing (meth)acrylate (B) represented by the following general formula (b-1), and a phosphorus-containing (meth)acrylate (C) represented by the following general formula (c-1):

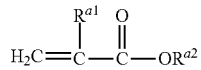
(a-1)

wherein in the general formula (a-1), $R^{a1}$ represents a hydrogen atom or a methyl group; and $R^{a2}$ represents an alkyl group having 8 to 20 carbon atoms,

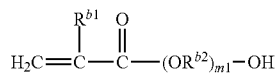
(b-1)

wherein in the general formula (b-1), $R^{b1}$ represents a hydrogen atom or a methyl group; $R^{b2}$ represents an alkylene group having 2 to 4 carbon atoms; and m1 represents an integer of 1 to 10, in which in the case where m1 represents an integer of 2 or more, plural groups represented by $R^{b2}$ may be the same as or different from each other,

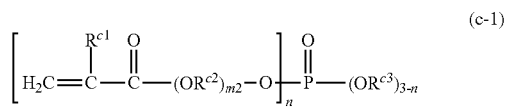
(c-1)

wherein in the general formula (c-1), $R^{c1}$ represents a hydrogen atom or a methyl group; $R^{c2}$ represents an ethylene group; m2 represents an integer of 1 to 6, in which in the case where m2 represents an integer of 2 or more, plural groups represented by $R^{c2}$ may be the same as or different from each other; n represents an integer of 1 or 2; and in the case where n=1, at least one of plural groups represented by $R^{c3}$ is a hydrogen atom, and in the case where n=2, $R^{c3}$ represents a hydrogen atom.

Advantageous Effects of Invention

According to the present invention, a lubricating oil additive composition that is suitable as a load bearing additive, and is excellent in wear resistance, extreme pressure property, and thermal stability, and a lubricating oil composition containing the lubricating oil additive composition can be provided.

DESCRIPTION OF EMBODIMENTS

The upper limit values and the lower limit values of the numerical ranges shown in the description herein may be optionally combined. For example, in the case where "A to B" and "C to D" are shown as numerical ranges, numerical ranges "A to D" and "C to B" are also encompassed in the present invention.

The numerical range "(lower limit value) to (upper limit value)" shown in the description herein means the lower limit value or more and the upper limit value or less unless otherwise indicated.

The numerical values in Examples in the description herein are numerical values that can be used as the upper limit value or the lower limit value.

In the description herein, "(meth)acrylate" means acrylate or methacrylate, and the same is applied to all the analogous terms.

[Embodiments of Lubricating Oil Additive Composition]

The lubricating oil additive composition of the present embodiment contains a poly(meth)acrylate-based copolymer (X).

The poly(meth)acrylate-based copolymer (X) contains a structural unit (a) derived from an alkyl (meth)acrylate (A) represented by the following general formula (a-1), a structural unit (b) derived from a hydroxy group-containing (meth)acrylate (B) represented by the following general formula (b-1), and a structural unit (c) derived from a phosphorus-containing (meth)acrylate (C) represented by the following general formula (c-1):

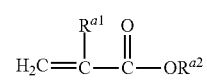
(a-1)

wherein in the general formula (a-1), $R^{a1}$ represents a hydrogen atom or a methyl group; and $R^{a2}$ represents an alkyl group having 8 to 20 carbon atoms,

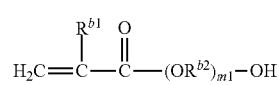
(b-1)

wherein in the general formula (b-1), $R^{b1}$ represents a hydrogen atom or a methyl group; $R^{b2}$ represents an alkylene group having 2 to 4 carbon atoms; and m1 represents an integer of 1 to 10, in which in the case where m1 represents an integer of 2 or more, plural groups represented by $R^{b2}$ may be the same as or different from each other,

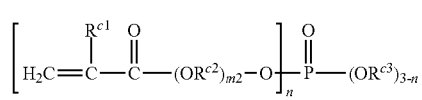
(c-1)

wherein in the general formula (c-1), $R^{c1}$ represents a hydrogen atom or a methyl group; $R^{c2}$ represents an ethylene group; m2 represents an integer of 1 to 6, in which in the case where m2 represents an integer of 2 or more, plural groups represented by $R^{c2}$ may be the same as or different from each other; n represents an integer of 1 or 2; and in the case where n=1, at least one of plural groups represented by $R^{c3}$ is a hydrogen atom, and in the case where n=2, $R^{c3}$ represents a hydrogen atom.

The present inventors have made earnest investigations for solving the problem. As a result, it has been found that the poly(meth)acrylate-based copolymer (X) containing a structural unit (a) derived from an alkyl (meth)acrylate (A) represented by the general formula (a-1), a structural unit (b) derived from a hydroxy group-containing (meth)acrylate (B) represented by the general formula (b-1), and a structural unit (c) derived from a phosphorus-containing (meth)acrylate (C) represented by the general formula (c-1) is excellent in wear resistance, extreme pressure property, and thermal stability, and the poly(meth)acrylate-based copolymer (X)

can be favorably used as a lubricating oil additive (particularly a load bearing additive).

It is estimated that the mechanism that the poly(meth)acrylate-based copolymer (X) is excellent in wear resistance, extreme pressure property, and thermal stability is that the oil solubility is secured by the structural unit (a) contained, a multiple point adsorption type polymer is obtained by the structural unit (b) contained, and a phosphoric acid group or a group derived from an acidic phosphate ester is introduced to the side chain by the structural unit (c) contained. More specifically, in the lubricating oil composition, the phosphoric acid group or the group derived from an acidic phosphate ester introduced to the side chain is protected through the steric hindrance of the poly(meth)acrylate-based copolymer (X), so as to enhance the thermal stability. In the meantime, it is estimated that in the sliding part, the poly(meth)acrylate-based copolymer (X) is compressed to expose the phosphoric acid group or the group derived from an acidic phosphate ester introduced to the side chain, and thereby the phosphorus component is reacted with the metal to enhance the wear resistance and the extreme pressure property.

In the following description, the alkyl (meth)acrylate (A), the hydroxy group-containing (meth)acrylate (B), and the phosphorus-containing (meth)acrylate (C) may be referred to as a "monomer (A)", a "monomer (B)", and a "monomer (C)", respectively.

In the present embodiment, the poly(meth)acrylate-based copolymer (X) may be constituted only by the structural unit (a) derived from the monomer (A), the structural unit (b) derived from the monomer (B), and the structural unit (c) derived from the monomer (C), and may contain a structural unit other than the structural units (a), (b), and (c), in such a range that does not impair the effects of the present invention.

In the present embodiment, the total content of the structural units (a), (b), and (c) in the poly(meth)acrylate-based copolymer (X) is preferably 70% by mol to 100% by mol, more preferably 80% by mol to 100% by mol, and further preferably 90% by mol to 100% by mol, based on the total structural units of the poly(meth)acrylate-based copolymer (X).

The alkyl (meth)acrylate (A), the hydroxy group-containing (meth)acrylate (B), the phosphorus-containing (meth)acrylate (C) will be described in detail below.

<Alkyl (Meth)acrylate (A)>

The alkyl (meth)acrylate (A) used in the present embodiment is represented by the following general formula (a-1).

(a-1)

The structural unit (a) derived from the alkyl (meth)acrylate (A) mainly bears the function exerting the oil solubility in the poly(meth)acrylate-based copolymer (X).

One kind of the alkyl (meth)acrylate (A) may be used alone, or two or more kinds thereof may be used in combination. Accordingly, the poly(meth)acrylate-based copolymer (X) may contain one kind of the structural unit (a) derived from the alkyl (meth)acrylate (A) alone, or may contain two or more kinds thereof.

In the general formula (a-1), $R^{a1}$ represents a hydrogen atom or a methyl group. Accordingly, the alkyl (meth)acrylate (A) has an acryloyl group or a methacryloyl group as a polymerizable functional group.

Monomers having a substituent other than a hydrogen atom and a methyl group as $R^{a1}$ are difficult to acquire, and the monomers are difficult to polymerize due to the low reactivity thereof.

In the present embodiment, $R^{a1}$ preferably represents a hydrogen atom from the standpoint of facilitating the regulation of the molecular weight of the poly(meth)acrylate-based copolymer (X). Accordingly, the alkyl (meth)acrylate (A) preferably has an acryloyl group as a polymerizable functional group.

In the general formula (a-1), $R^{a2}$ represents an alkyl group having 8 to 20 carbon atoms.

In both the case where the number of carbon atoms of the alkyl group is less than 8, and the case where the number of carbon atoms of the alkyl group exceeds 20, it is difficult to secure the oil solubility of the poly(meth)acrylate-based copolymer (X).

Examples of the alkyl group having 8 to 20 carbon atoms that can be selected as $R^{a2}$ include a chain-like alkyl group, such as an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group. These groups may be linear chain-like groups or branched chain-like groups.

The number of carbon atoms of the alkyl group is preferably 10 to 18, more preferably 10 to 16, and further preferably 10 to 14, from the standpoint of the further securement of the oil solubility of the poly(meth)acrylate-based copolymer (X).

<Hydroxy Group-Containing (Meth)Acrylate (B)>

The hydroxy group-containing (meth)acrylate (B) used in the present embodiment is represented by the following general formula (b-1).

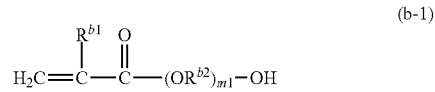

(b-1)

The structural unit (b) derived from the hydroxy group-containing (meth)acrylate (B) bears the function allowing the poly(meth)acrylate-based copolymer (X) to be a multiple point adsorption type polymer, and is estimated to contribute to the enhancement of the wear resistance and the extreme pressure property.

One kind of the hydroxy group-containing (meth)acrylate (B) may be used alone, or two or more kinds thereof may be used in combination. Accordingly, the poly(meth)acrylate-based copolymer (X) may contain one kind of the structural unit (b) derived from the hydroxy group-containing (meth) acrylate (B) alone, or may contain two or more kinds thereof.

In the general formula (b-1), $R^{b1}$ represents a hydrogen atom or a methyl group. Accordingly, the hydroxy group-containing (meth)acrylate (B) has an acryloyl group or a methacryloyl group as a polymerizable functional group.

Monomers having a substituent other than a hydrogen atom and a methyl group as $R^{b1}$ are difficult to acquire, and the monomers are difficult to polymerize due to the low reactivity thereof.

In the present embodiment, $R^{b1}$ preferably represents a hydrogen atom from the standpoint of facilitating the regulation of the molecular weight of the poly(meth)acrylate-based copolymer (X). Accordingly, the hydroxy group-containing (meth)acrylate (B) preferably has an acryloyl group as a polymerizable functional group.

In the general formula (b-1), $R^{b2}$ represents an alkylene group having 2 to 4 carbon atoms.

In the case where the number of carbon atoms of the alkylene group is 1, the polarity is increased to lower the oil solubility.

In the case where the number of carbon atoms of the alkylene group exceeds 5, the oil solubility is too increased to lower the absorbability to metals.

The number of carbon atoms of the alkylene group is preferably 2 to 3, and more preferably 2, from the standpoint of facilitating the securement of the suitable oil solubility and the suitable absorbability to metals.

m1 represents an integer of 1 to 10. In the case where m1 represents an integer of 2 or more, plural groups represented by $R^{b2}$ may be the same as or different from each other. The bond mode of the moieties represented by —$(OR^{b2})_{m1}$— may be random bond or block bond, and is preferably random bond from the standpoint of the easiness in polymerization.

In the case where m1 represents 0, the hydroxy group-containing (meth)acrylate (B) becomes a carboxylic acid to lower the oil solubility.

In the case where m1 represents an integer of 11 or more, the polarity is increased due to the influence of the moiety represented by —$(OR^{b2})$—, so as to lower the oil solubility.

m1 is preferably 1 to 6, more preferably 1 to 4, further preferably 1 to 2, and still further preferably 1, from the standpoint of facilitating the securement of the suitable oil solubility.

<Phosphorus-Containing (Meth)Acrylate (C)>

The phosphorus-containing (meth)acrylate (C) used in the present invention is represented by the following general formula (c-1).

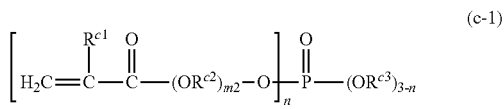

(c-1)

It is estimated that the structural unit (c) derived from the phosphorus-containing (meth)acrylate (C) bears the function enhancing the wear resistance and the extreme pressure property by introducing a phosphoric acid group or a group derived from an acidic phosphate ester to the side chain of the poly(meth)acrylate-based copolymer (X).

Phosphorus is an element that is a factor deteriorating the thermal stability, and therefore is generally not introduced from the standpoint of securing the thermal stability. However, the present inventors have investigated the introduction of a phosphoric acid group or a group derived from an acidic phosphate ester from the standpoint of enhancing the wear resistance and the extreme pressure property, and have consequently found that the problem of deterioration in thermal stability caused by introducing phosphorus can be mitigated by introducing the structural unit (c) derived from the phosphorus-containing (meth)acrylate (C) into the polymer having the combination of the structural unit (a) derived from the alkyl (meth)acrylate (A) and the structural unit (b) derived from the hydroxy group-containing (meth)acrylate (B), and thereby the poly(meth)acrylate-based copolymer (X) has excellent thermal stability in total and also becomes a polymer excellent in wear resistance and extreme pressure property.

One kind of the phosphorus-containing (meth)acrylate (C) may be used alone, or two or more kinds thereof may be used in combination. Accordingly, the poly(meth)acrylate-based copolymer (X) may contain one kind of the structural unit (c) derived from the phosphorus-containing (meth)acrylate (C) alone, or may contain two or more kinds thereof.

In the general formula (c-1), $R^{c1}$ represents a hydrogen atom or a methyl group. Accordingly, the phosphorus-containing (meth)acrylate (C) has an acryloyl group or a methacryloyl group as a polymerizable functional group.

Monomers having a substituent other than a hydrogen atom and a methyl group as $R^{c1}$ are difficult to acquire, and the monomers are difficult to polymerize due to the low reactivity thereof.

In the present embodiment, $R^{c1}$ preferably represents a hydrogen atom from the standpoint of facilitating the regulation of the molecular weight of the poly(meth)acrylate-based copolymer (X). Accordingly, the phosphorus-containing (meth)acrylate (C) preferably has an acryloyl group as a polymerizable functional group.

In the general formula (c-1), $R^{c2}$ represents an ethylene group.

In the case where the number of carbon atoms of the alkylene group is 1, the polarity is increased to lower the oil solubility.

In the case where the number of carbon atoms of the alkylene group is 3 or more, the oil solubility is too increased to lower the absorbability to metals.

m2 represents an integer of 1 to 6. In the case where m2 represents an integer of 2 or more, plural groups represented by $R^{c2}$ may be the same as or different from each other. The bond mode of the moieties represented by —$(OR^{c2})_{m2}$— may be random bond or block bond, and is preferably random bond from the standpoint of the easiness in polymerization.

In the case where m2 represents 0, the polarity of the phosphorus-containing (meth)acrylate (C) is increased to lower the oil solubility.

In the case where m2 represents an integer of 7 or more, the polarity is increased due to the influence of the moiety represented by —$(OR^{c2})$—, so as to lower the oil solubility.

m2 is preferably 1 to 4, more preferably 1 to 2, and further preferably 1, from the standpoint of facilitating the securement of the suitable oil solubility.

n represents an integer of 1 or 2. In the case where n=1, at least one of plural groups represented by $R^{c3}$ is a hydrogen atom. In the case where n=2, $R^{c3}$ represents a hydrogen atom. In the case where n=1, only one of plural groups represented by $R^{c3}$ may be a hydrogen atom. In this case, the other one of plural groups represented by $R^{c3}$ is a hydrocarbon group.

In the case where n=1, and the other one of plural groups represented by $R^{c3}$ is a hydrocarbon group, the hydrocarbon group is preferably a methyl group or an ethyl group from the standpoint of facilitating the exhibition of the effects of the present invention.

In the case where n=1, plural groups represented by $R^{c3}$ are all preferably hydrogen atoms from the standpoint of facilitating the exhibition of the effects of the present invention.

The phosphorus-containing (meth)acrylate (C) preferably contains a phosphorus-containing (meth)acrylate (C1) having n=1 as a major component from the standpoint of facilitating the exhibition of the effects of the present invention.

In the description herein, the "major component" means a component having a content thereof exceeding 50% by mass. Accordingly, the content of the phosphorus-containing (meth)acrylate (C1) having n=1 is preferably more than 50% by mass to 100% by mass, more preferably 60% by mass to 100% by mass, further preferably 70% by mass to 100% by mass, still further preferably 80% by mass to 100% by mass, and still more further preferably 90% by mass to 100% by mass, based on the total amount of the phosphorus-containing (meth)acrylate (C).

The content of the structural unit (c1) derived from the phosphorus-containing (meth)acrylate (C1) having n=1 is preferably more than 50% by mass to 100% by mass, more preferably 60% by mass to 100% by mass, further preferably 70% by mass to 100% by mass, still further preferably 80% by mass to 100% by mass, and still more further preferably 90% by mass to 100% by mass, based on the total amount of the structural unit (c) derived from the phosphorus-containing (meth)acrylate (C).

The phosphorus-containing (meth)acrylate (C) used in the present embodiment preferably has an acid value of 300 mgKOH/g to 600 mgKOH/g, and more preferably 350 mgKOH/g to 550 mgKOH/g, from the standpoint of further enhancing the wear resistance and the extreme pressure property of the poly(meth)acrylate-based copolymer (X).

In the description herein, the acid value of the phosphorus-containing (meth)acrylate (C) means a value that is measured by the potentiometric method defined in JIS K2501:2003-7.

<Condition (α)>

The poly(meth)acrylate-based copolymer (X) of the present embodiment preferably satisfies the condition (α) from the standpoint of facilitating the exhibition of the effects of the present invention and the standpoint of the solubility in the base oil. Specifically, the content ratio [(a)/(b)] of the structural unit (a) and the structural unit (b) in terms of molar ratio is preferably 20/80 to 80/20.

The ratio [(a)/(b)] is more preferably 40/60 or more, and further preferably or more, from the standpoint of further improving the solubility of the poly(meth)acrylate-based copolymer (X) in the base oil.

The ratio [(a)/(b)] is more preferably 75/25 or less, and further preferably or less, from the standpoint of further facilitating the exhibition of the effects of the present invention.

The upper limit values and the lower limit values of these numerical ranges may be optionally combined. Specifically, the ratio is more preferably to 75/25, and further preferably 50/50 to 70/30.

<Condition (β)>

The poly(meth)acrylate-based copolymer (X) of the present embodiment preferably satisfies the condition (β) from the standpoint of facilitating the exhibition of the effects of the present invention. Specifically, the phosphorus content of the poly(meth)acrylate-based copolymer (X) is preferably 0.05% by mass or more and 1.0% by mass or less based on the total amount of the poly(meth)acrylate-based copolymer (X). The phosphorus content is more preferably 0.10% by mass or more, and further preferably 0.20% by mass or more, based on the total amount of the poly(meth)acrylate-based copolymer (X), from the standpoint of further facilitating the exhibition of the effects of the present invention. The phosphorus content is more preferably 0.70% by mass or less, further preferably 0.50% by mass or less, still further preferably 0.40% by mass or less, and still more further preferably 0.30% by mass or less.

The upper limit values and the lower limit values of these numerical ranges may be optionally combined. Specifically, the phosphorus content is more preferably 0.10% by mass to 0.70% by mass, further preferably 0.10% by mass to 0.50% by mass, still further preferably 0.20% by mass to 0.40% by mass, and still more further preferably 0.20% by mass to 0.30% by mass.

The phosphorus content of the poly(meth)acrylate-based copolymer (X) can be calculated based on the result obtained by dissolving a prescribed amount of the poly(meth)acrylate-based copolymer (X) in an organic solvent (such as a lubricant base oil) and then measuring the phosphorus amount in the organic solvent according to JPI-5S-38-03, and the amount of the poly(meth)acrylate-based copolymer (X) dissolved in the organic solvent.

<Additional Monomer>

The poly(meth)acrylate-based copolymer (X) may contain a structural unit derived from an additional monomer, in addition to the structural units (a), (b), and (c), in such a range that does not impair the effects of the present invention. Examples of the additional monomer include a functional group-containing monomer other than the monomers (A), (B), and (C). Examples of the additional functional group-containing monomer include a functional group-containing (meth)acrylate other than the monomers (A), (B), and (C).

However, from the standpoint of further facilitating the exhibition of the effects of the present invention, the total content of the structural units (a), (b), and (c) of the poly(meth)acrylate-based copolymer (X) is preferably more than 50% by mass to 100% by mass, more preferably 60% by mass to 100% by mass, further preferably 70% by mass to 100% by mass, still further preferably 80% by mass to 100% by mass, and still more further preferably 90% by mass to 100% by mass, based on the total structural units of the poly(meth)acrylate-based copolymer (X).

Furthermore, from the standpoint of further facilitating the exhibition of the effects of the present invention, the content of the structural unit derived from the functional group-containing monomer other than the monomers (A), (B), and (C) of the poly(meth)acrylate-based copolymer (X) is preferably 50% by mass or less, more preferably less than 40% by mass, further preferably less than 30% by mass, still further preferably less than 20% by mass, and still more further preferably 10% by mass, based on the total structural units.

<Properties of Poly(Meth)Acrylate-Based Copolymer (X)>

(Mass Average Molecular Weight (Mw) and Molecular Weight Distribution (Mw/Mn))

The mass average molecular weight (Mw) of the poly(meth)acrylate-based copolymer (X) of the present embodiment is preferably 5,000 to 100,000, more preferably 5,000 to 50,000, and further preferably 5,000 to 40,000, from the standpoint of further facilitating the exhibition of the effects of the present invention and the standpoint of the solubility in the base oil.

The molecular weight distribution (Mw/Mn) of the poly(meth)acrylate-based copolymer (X) of the present embodiment is preferably 3.5 or less, more preferably 3.0 or less, and further preferably 2.8 or less, from the standpoint of further facilitating the exhibition of the effects of the present invention. The molecular weight distribution (Mw/Mn) of the poly(meth)acrylate-based copolymer (X) of the present embodiment may be 1.01 or more, may be 1.3 or more, and may be 1.5 or more.

The mass average molecular weight (Mw) and the molecular weight distribution (Mw/Mn) are values that are measured or calculated by the methods shown in Examples described later.

(Polymerization Mode)

The polymerization mode of the poly(meth)acrylate-based copolymer (X) of the present embodiment is not particularly limited, and may be any of block copolymerization, random copolymerization, and block-random copolymerization. Among these, random copolymerization is preferred from the standpoint of the easiness of the polymerization reaction.

[Method for Producing Lubricating Oil Additive Composition]

The method for producing a lubricating oil additive composition of the present embodiment includes a step (S) of producing a poly(meth)acrylate-based copolymer (X) by polymerizing an alkyl (meth)acrylate (A) represented by the following general formula (a-1), a hydroxy group-containing (meth)acrylate (B) represented by the following general formula (b-1), and a phosphorus-containing (meth)acrylate (C) represented by the following general formula (c-1):

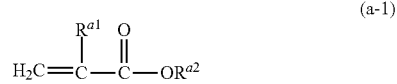
(a-1)

wherein in the general formula (a-1), $R^{a1}$ represents a hydrogen atom or a methyl group; and $R^{a2}$ represents an alkyl group having 8 to 20 carbon atoms,

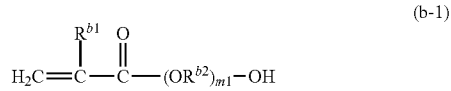
(b-1)

wherein in the general formula (b-1), $R^{b1}$ represents a hydrogen atom or a methyl group; $R^{b2}$ represents an alkylene group having 2 to 4 carbon atoms; and m1 represents an integer of 1 to 10, in which in the case where m1 represents an integer of 2 or more, plural groups represented by $R^{b2}$ may be the same as or different from each other,

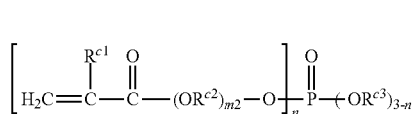
(c-1)

wherein in the general formula (c-1), $R^{c1}$ represents a hydrogen atom or a methyl group; $R^{c2}$ represents an ethylene group; m2 represents an integer of 1 to 6, in which in the case where m2 represents an integer of 2 or more, plural groups represented by $R^{c2}$ may be the same as or different from each other; n represents an integer of 1 or 2; and in the case where n=1, at least one of plural groups represented by $R^{c3}$ is a hydrogen atom, and in the case where n=2, $R^{c3}$ represents a hydrogen atom.

The step (S) of producing the poly(meth)acrylate-based copolymer (X) will be described in detail below.

<Step (S) of Producing Poly(Meth)Acrylate-Based Copolymer (X)>

The production method (polymerization method) of the poly(meth)acrylate-based copolymer (X) is not particularly limited, and the production thereof may be achieved by applying any of the known methods. Examples of the method include an emulsion polymerization method, a suspension polymerization method, and a solution polymerization method.

The production method (polymerization method) of the poly(meth)acrylate-based copolymer (X) employed is preferably a solution polymerization method using a solvent dissolved in a lubricant base oil as the solvent from the standpoint of the purpose of the poly(meth)acrylate-based copolymer (X) of the present invention, i.e., the purpose as a lubricating oil additive composition.

(Solution Polymerization Method)

The solution polymerization method may be performed in such a manner that the monomers (A), (B), and (C), the solvent, and an initiator are charged in a reactor, and after purging the reactor with nitrogen, reacted by agitating at 60° C. to 100° C. for 2 hours to 10 hours. The additional monomer other than the monomers (A), (B), and (C) may be optionally charged in the reactor.

Examples of the solvent used in the solution polymerization method include an alcohol compound, such as methanol, ethanol, propanol, 2-propanol, and butanol; a hydrocarbon compound, such as benzene, toluene, xylene, and hexane; an ester compound, such as ethyl acetate, butyl acetate, and isobutyl acetate; a ketone compound, such as acetone, methyl ethyl ketone, and methyl isobutyl ketone; an ether compound, such as methoxybutanol, ethoxybutanol, ethylene glycol monomethyl ether, ethylene glycol monobutyl ether, propylene glycol monobutyl ether, and dioxane; a mineral oil; and a synthetic oil, such as a poly-α-olefin, an ethylene-α-olefin copolymer, an alkylbenzene, an alkylnaphthalene, a polyphenyl ether, an alkyl-substituted diphenyl ether, a polyol ester, a dibasic acid ester, a hindered ester, a monoester, and a GTL base oil.

One kind of these materials may be used alone, or two or more kinds thereof may be used in combination.

Examples of the initiator used in the solution polymerization method include an azo-based initiator, such as 2,2'-azobis(isobutyronitrile), 2,2'-azobis(2-amidinopropane) dihydrochloride, 2,2'-azobis(N,N-dimethyleneisobutylamidine) dihydrochloride, and 1,1'-azobis(cyclohexyl-1-carbonitrile); hydrogen peroxide; an organic peroxide, such as benzoyl peroxide, t-butyl hydroperoxide, cumene hydroperoxide, methyl ethyl ketone peroxide, and perbenzoic acid; a persulfate salt, such as sodium persulfate, potassium persulfate, and ammonium persulfate; a redox initiator of hydrogen peroxide-Fe 2+; and the other known radical initiators.

The molecular weight of the poly(meth)acrylate-based copolymer (X) may be regulated by the known method. For example, the molecular weight of the poly(meth)acrylate-based copolymer (X) can be regulated by the reaction temperature, the reaction time, the amount of the initiator, the amounts of the monomers charged, the kind of the solvent, the use of a chain transfer agent, and the like.

Preferred Embodiment 1 in Step (S)

In the step (5), the blending ratio [(A)/(B)] of the alkyl (meth)acrylate (A) and the hydroxy group-containing (meth)acrylate (B) in terms of molar ratio is preferably regulated to 20/80 to 80/20 from the standpoint of the production of the poly(meth)acrylate-based copolymer (X) that satisfies the condition (α).

The ratio [(A)/(B)] is more preferably 40/60 or more, and more preferably or more, from the standpoint of improving the solubility of the poly(meth)acrylate-based copolymer (X) in a base oil.

The ratio [(A)/(B)] is more preferably 75/25 or less, and further preferably or less, from the standpoint of facilitating the exhibition of the effects of the present invention.

The upper limit values and the lower limit values of these numerical ranges may be optionally combined. Specifically, the ratio is more preferably to 75/25, and further preferably 50/50 to 70/30.

Preferred Embodiment 2 in Step (S)

In the step (5), the blending ratio [(C)/{(A)+(B)}] of the phosphorus-containing (meth)acrylate (C) and the total amount of the alkyl (meth)acrylate (A) and the hydroxy group-containing (meth)acrylate (B) in terms of molar ratio is preferably regulated to 0.1/100 to 10/100 from the standpoint of the production of the poly(meth)acrylate-based copolymer (X) that satisfies the condition (6).

The ratio [(C)/{(A)+(B)}] is more preferably 0.5/100 or more, and further preferably 1.0/100 or more, from the standpoint of facilitating the further enhancement of the wear resistance and the extreme pressure property of the poly(meth)acrylate-based copolymer (X).

The ratio [(C)/{(A)+(B)}] is more preferably 5.0/100 or less, and further preferably 3.0/100 or less, from the standpoint of facilitating the further enhancement of the thermal stability of the poly(meth)acrylate-based copolymer (X).

The upper limit values and the lower limit values of these numerical ranges may be optionally combined. Specifically, the ratio is more preferably 0.5/100 to 5.0/100, and further preferably 1.0/100 to 3.0/100.

<Content of Poly(Meth)Acrylate-Based Copolymer (X) in Lubricating Oil Additive Composition>

In the lubricating oil additive composition of the present embodiment, the content of the poly(meth)acrylate-based copolymer (X) is preferably 50% by mass or more, more preferably 60% by mass or more, further preferably 70% by mass or more, still further preferably 80% by mass or more, still more further preferably 90% by mass or more, and still more further preferably 95% by mass or more, based on the total amount of the lubricating oil additive composition, from the standpoint of facilitating the exhibition of the effects of the present invention in adding to a lubricant base oil. The content of the poly(meth)acrylate-based copolymer (X) is generally less than 99% by mass based on the total amount of the lubricating oil additive composition in consideration of the purity of the poly(meth)acrylate-based copolymer (X).

The lubricating oil additive composition of the present embodiment may be diluted with a diluting solvent from the standpoint of the solubility in a lubricant base oil and the standpoint of the handleability. The content of the poly(meth)acrylate-based copolymer (X) in the lubricating oil additive composition means the content thereof based on the total amount of the lubricating oil additive composition excluding the diluting solvent.

<Application of Lubricating Oil Additive Composition>

The lubricating oil additive composition of the present embodiment is excellent in wear resistance, extreme pressure property, and thermal stability, and therefore is useful as a load bearing additive.

Accordingly, the present embodiment provides a use method including using the lubricating oil additive composition as a load bearing additive.

[Lubricating Oil Composition]

The lubricating oil composition of the present embodiment contains the lubricating oil additive composition containing the poly(meth)acrylate-based copolymer (X), and a lubricant base oil.

The content of the lubricating oil additive composition is regulated to make a content of the resin component of the poly(meth)acrylate-based copolymer (X) of preferably 0.3% by mass to 10% by mass, more preferably 0.6% by mass to 6.0% by mass, and further preferably 1.0% by mass to 5.0% by mass, based on the total amount of the lubricating oil composition, from the standpoint of favorably exhibiting the effects of the addition of the lubricating oil additive composition.

The content of the lubricating oil additive composition is regulated to make a phosphorus amount derived from the poly(meth)acrylate-based copolymer (X) of preferably 10 ppm by mass to 300 ppm by mass, more preferably 20 ppm by mass to 200 ppm by mass, and further preferably 30 ppm by mass to 150 ppm by mass, based on the total amount of the lubricating oil composition, from the standpoint of favorably exhibiting the effects of the addition of the lubricating oil additive composition.

<Lubricant Base Oil>

The lubricant base oil used may be an ordinary base oil used in lubricating oil compositions with no particular limitation. Specific examples include one or more kind selected from the group consisting of a mineral oil and a synthetic oil.

The kinematic viscosity at 100° C. of the lubricant base oil is preferably in a range of 1 $mm^2/s$ to 50 $mm^2/s$, more preferably in a range of 2 $mm^2/s$ to 30 $mm^2/s$, and further preferably in a range of 3 $mm^2/s$ to 20 $mm^2/s$. The viscosity index of the lubricant base oil is preferably 80 or more, more preferably 90 or more, and further preferably 100 or more.

The kinematic viscosity and the viscosity index of the lubricant base oil are values that are measured or calculated according to JIS K2283:2000.

Specific examples of the lubricant base oil are shown below.

Examples of the mineral oil include distillate oil obtained through atmospheric distillation and/or reduced pressure distillation of a paraffin base crude oil, an intermediate base crude oil, or a naphthene base crude oil; and a refined oil obtained through refining of the distillate oil according to the ordinary method. Examples of the refining method for providing the refined oil include a solvent dewaxing treatment, a hydrogenation-isomerization treatment, a hydrogenation finishing treatment, and a white clay treatment.

Examples of the synthetic oil include a hydrocarbon-based oil, an aromatic-based oil, an ester-based oil, and an ether-based oil. The synthetic oil used may be GTL (gas-to-liquids) obtained through isomerization of wax produced from natural gas by the Fischer-Tropsch process (GTL wax, gas-to-liquids wax).

<Additional Additives>

The lubricating oil composition of the present embodiment may contain additional additives, such as an antioxidant, an oiliness agent, a detergent dispersant, a viscosity index improver, a rust inhibitor, a metal deactivator, and an anti-foaming agent, in such a range that does not impair the effects of the lubricating oil additive composition. One kind of these materials may be used alone, or two or more kinds thereof may be used in combination.

The present embodiment also provides an additive package for a lubricating oil composition, containing the lubricating oil additive composition containing the poly(meth)acrylate-based copolymer (X), and also containing one or more kind of an additive selected from an antioxidant, an oiliness agent, a detergent dispersant, a viscosity index improver, a rust inhibitor, a metal deactivator, an anti-foaming agent, and the like, as the additional additive other than the lubricating oil additive composition containing the poly(meth)acrylate-based copolymer (X).
(Antioxidant)

The antioxidant used may be an amine-based antioxidant, a phenol-based antioxidant, and the like having been used in lubricating oil compositions. One kind of the antioxidant may be used alone, or two or more kinds thereof may be used in combination.

Examples of the amine-based antioxidant include a monoalkyldiphenylamine-based compound, such as monooctyldiphenylamine and monononyldiphenylamine; a dialkyldiphenylamine-based compound, such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, and 4,4'-dinonyldiphenylamine; a polyalkyldiphenylamine-based compound, such as tetrabutyldiphenylamine, tetrahexyldiphenylamine, tetraoctyldiphenylamine, and tetranonyldiphenylamine; and a naphthylamine-based compound, such as α-naphthylamine, phenyl-α-napthylamine, butylphenyl-α-naphthylamine, pentylphenyl-α-naphthylamine, hexylphenyl-α-naphthylamine, heptylphenyl-α-naphthylamine, octylphenyl-α-naphthylamine, and nonylphenyl-α-naphthylamine.

Examples of the phenol-based antioxidant include a monophenol-based compound, such as 2,6-di-tert-butyl-4-methylphenol and 2,6-di-tert-butyl-4-ethylphenol; and a bisphenol-based compound, such as 4,4'-methylenebis(2,6-di-tert-butylphenol) and 2,2'-methylenebis(4-ethyl-6-tert-butylphenol).

It suffices that the content of the antioxidant is the minimum amount that is necessary for retaining the oxidation stability of the lubricating oil composition. Specifically, for example, the content thereof is preferably 0.01 to 1% by mass based on the total amount of the lubricating oil composition.
(Oiliness Agent)

Examples of the oiliness agent include an aliphatic alcohol; a fatty acid compound, such as a fatty acid and a fatty acid metal salt; an ester compound, such as a polyol ester, a sorbitan ester, and a glyceride; and an amine compound, such as an aliphatic amine.

The content of the oiliness agent is generally 0.1 to 20% by mass, and preferably 0.5 to 10% by mass, based on the total amount of the lubricating oil composition, from the standpoint of the effect of the addition thereof.
(Detergent Dispersant)

Examples of the detergent dispersant include a metal sulfonate, a metal salicylate, a metal phenate, and a succinimide.

The content of the detergent dispersant is generally 0.01 to 10% by mass, and preferably 0.1 to 5% by mass, based on the total amount of the lubricating oil composition, from the standpoint of the effect of the addition thereof.
(Viscosity Index Improver)

Examples of the viscosity index improver include a polymethacrylate, a dispersed polymethacrylate, an olefin-based copolymer (such as an ethylene-propylene copolymer), a dispersed olefin-based copolymer, and a styrene-based copolymer (such as a styrene-diene hydrogenated copolymer).

The content of the viscosity index improver is preferably 0.3 to 5% by mass based on the total amount of the lubricating oil composition.

(Rust Inhibitor)

Examples of the rust inhibitor include a metal-based sulfonate, a succinate ester, an alkylamine, and an alkanolamine, such as monoisopropanolamine.

The content of the rust inhibitor is generally 0.01 to 5% by mass, and preferably 0.03 to 3% by mass, based on the total amount of the lubricating oil composition, from the standpoint of the effect of the addition thereof.
(Metal Deactivator)

Examples of the metal deactivator include benzotriazole and thiadiazole.

The content of the metal deactivator is generally 0.01 to 5% by mass, and preferably 0.01 to 1% by mass, based on the total amount of the lubricating oil composition, from the standpoint of the effect of the addition thereof.
(Anti-Foaming Agent)

Examples of the anti-foaming agent include a methylsilicone oil, a fluorosilicone oil, and a polyacrylate.

The content of the anti-foaming agent is generally 0.0005 to 0.01% by mass based on the total amount of the lubricating oil composition from the standpoint of the effect of the addition thereof.
<Grease Composition>

The lubricating oil additive composition of the present embodiment can be used by blending in a grease composition.

Accordingly, the present embodiment can also provide a grease composition containing the lubricating oil additive composition, a thickening agent, and a lubricant base oil.
<Properties of Lubricating Oil Composition>
(Kinematic Viscosity and Viscosity Index)

The kinematic viscosity at 100° C. of the lubricating oil composition of the present embodiment is preferably 1.0 mm$^2$/s to 50 mm$^2$/s, more preferably 2.0 mm$^2$/s to 30 mm$^2$/s, and further preferably 3.0 mm$^2$/s to 20 mm$^2$/s.

The viscosity index of the lubricating oil composition of the present embodiment is preferably 90 or more, more preferably 100 or more, and further preferably 110 or more.

The kinematic viscosity and the viscosity index of the lubricating oil composition are values that are measured or calculated according to JIS K2283:2000.
(Wear Resistance)

The lubricating oil composition of the present embodiment preferably has a wear track diameter by the shell wear test shown in Examples described later of 0.50 mm or less, more preferably 0.47 mm or less, and further preferably 0.45 mm or less.
(Extreme Pressure Property)

The lubricating oil composition of the present embodiment preferably has a last non-seizure load (LNL) by the shell four-ball load bearing (EP) test shown in Examples described later of 490 N or more, more preferably 618 N or more, and further preferably 785 N or more.

The weld load (WL) by the same test is preferably 1,569 N or more, and more preferably 1,961 N or more.
(Thermal Stability)

The lubricating oil composition of the present embodiment preferably has a sludge generation amount after the ISOT test shown in Examples described later of less than 5.0 mg/100 mL.
[Application of Lubricating Oil Composition]

The lubricating oil composition of the present embodiment is excellent in wear resistance, extreme pressure property, and thermal stability due to the poly(meth)acrylate-based copolymer (X) contained therein.

Accordingly, the lubricating oil composition of the present embodiment can be favorably used, for example, in various applications including a drive train oil, such as a gear oil (such as a manual transmission fluid and a differential fluid), an automatic transmission fluid, a variable transmission fluid (such as a belt CVT fluid and a toroidal CVT fluid), a power steering fluid, a shock absorber fluid, and an electric motor oil; an engine oil for an internal combustion engine, such as a gasoline engine, a diesel engine, and a gas engine; a hydraulic fluid; a turbine oil; a compressor oil; a fluid dynamic bearing oil; a roller bearing oil; and a refrigerator oil, and can be charged in equipments used in these applications and used favorably as a lubricating oil composition that lubricates components of the equipments.

[Lubricating Method Using Lubricating Oil Composition]

Preferred examples of a lubricating method using the lubricating oil composition of the present embodiment include a method of charging the lubricating oil composition in equipments used in the aforementioned applications, and lubricating components of the equipments.

One Embodiment Provided by Present Invention

According to one embodiment of the present invention, the following items [1] to are provided.

[1] A lubricating oil additive composition containing a poly(meth)acrylate-based copolymer (X) containing a structural unit (a) derived from an alkyl (meth)acrylate (A) represented by the following general formula (a-1), a structural unit (b) derived from a hydroxy group-containing (meth)acrylate (B) represented by the following general formula (b-1), and a structural unit (c) derived from a phosphorus-containing (meth)acrylate (C) represented by the following general formula (c-1):

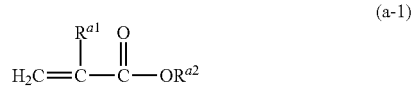

(a-1)

wherein in the general formula (a-1), $R^{a1}$ represents a hydrogen atom or a methyl group; and $R^{a2}$ represents an alkyl group having 8 to 20 carbon atoms,

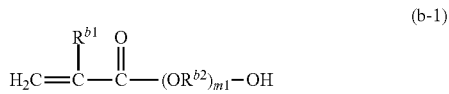

(b-1)

wherein in the general formula (b-1), $R^{b1}$ represents a hydrogen atom or a methyl group; $R^{b2}$ represents an alkylene group having 2 to 4 carbon atoms; and m1 represents an integer of 1 to 10, in which in the case where m1 represents an integer of 2 or more, plural groups represented by $R^{b2}$ may be the same as or different from each other,

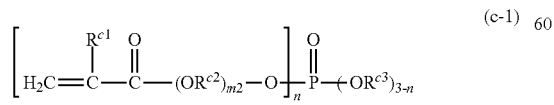

(c-1)

wherein in the general formula (c-1), $R^{c1}$ represents a hydrogen atom or a methyl group; $R^{c2}$ represents an ethylene group; m2 represents an integer of 1 to 6, in which in the case where m2 represents an integer of 2 or more, plural groups represented by $R^{c2}$ may be the same as or different from each other; n represents an integer of 1 or 2; and in the case where n=1, at least one of plural groups represented by $R^{c3}$ is a hydrogen atom, and in the case where n=2, $R^{c3}$ represents a hydrogen atom.

[2] The lubricating oil additive composition according to the item [1], wherein in the general formula (c-1), in the case where n=1, one of plural groups represented by $R^{c3}$ is a hydrogen atom, and the other one is a methyl group or an ethyl group.

[3] The lubricating oil additive composition according to the item [1], wherein in the general formula (c-1), in the case where n=1, plural groups represented by $R^{c3}$ are all hydrogen atoms.

[4] The lubricating oil additive composition according to any one of the items [1] to [3], wherein the poly(meth)acrylate-based copolymer (X) satisfies the following condition (α):
<Condition (α)>
a content ratio [(a)/(b)] of the structural unit (a) and the structural unit (b) in terms of molar ratio of 20/80 to 80/20.

[5] The lubricating oil additive composition according to any one of the items [1] to [4], wherein the poly(meth)acrylate-based copolymer (X) satisfies the following condition (6);
<Condition (β)>
a phosphorus content of the poly(meth)acrylate-based copolymer (X) of 0.05% by mass or more and 1.0% by mass or less based on the total amount of the poly(meth)acrylate-based copolymer (X).

[6] The lubricating oil additive composition according to any one of the items [1] to [5], wherein the poly(meth)acrylate-based copolymer (X) has a mass average molecular weight (Mw) of 5,000 to 100,000.

[7] The lubricating oil additive composition according to any one of the items [1] to [6], wherein the phosphorus-containing (meth)acrylate (C) has an acid value of 300 mgKOH/g to 600 mgKOH/g.

[8] The lubricating oil additive composition according to any one of the items [1] to [7], wherein the lubricating oil additive composition is used as a load bearing additive.

[9] A use method including using the lubricating oil additive composition according to any one of the items [1] to [8] as a load bearing additive.

[10] A lubricating oil composition containing the lubricating oil additive composition according to any one of the items [1] to [8] and a lubricant base oil.

[11] A method for producing a lubricating oil additive composition, including a step (S) of producing a poly(meth)acrylate-based copolymer (X) by polymerizing an alkyl (meth)acrylate (A) represented by the following general formula (a-1), a hydroxy group-containing (meth)acrylate (B) represented by the following general formula (b-1), and a phosphorus-containing (meth)acrylate (C) represented by the following general formula (c-1);

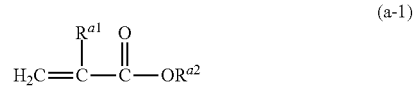

(a-1)

wherein in the general formula (a-1), $R^{a1}$ represents a hydrogen atom or a methyl group; and $R^{a2}$ represents an alkyl group having 8 to 20 carbon atoms,

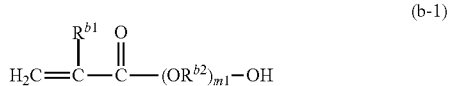

(b-1)

wherein in the general formula (b-1), $R^{b1}$ represents a hydrogen atom or a methyl group; $R^{b2}$ represents an alkylene group having 2 to 4 carbon atoms; and m1 represents an integer of 1 to 10, in which in the case where m1 represents an integer of 2 or more, plural groups represented by $R^{b2}$ may be the same as or different from each other,

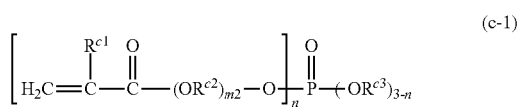

(c-1)

wherein in the general formula (c-1), $R^{c1}$ represents a hydrogen atom or a methyl group; $R^{c2}$ represents an ethylene group; m2 represents an integer of 1 to 6, in which in the case where m2 represents an integer of 2 or more, plural groups represented by $R^{c2}$ may be the same as or different from each other; n represents an integer of 1 or 2; and in the case where n=1, at least one of plural groups represented by $R^{c3}$ is a hydrogen atom, and in the case where n=2, $R^{c3}$ represents a hydrogen atom.

[12] The method for producing a lubricating oil additive composition according to the item [11], wherein in the general formula (c-1), in the case where n=1, one of plural groups represented by $R^{c3}$ is a hydrogen atom, and the other one is a methyl group or an ethyl group.

[13] The method for producing a lubricating oil additive composition according to the item or [12], wherein in the general formula (c-1), in the case where n=1, plural groups represented by $R^{c3}$ are all hydrogen atoms.

[14] The method for producing a lubricating oil additive composition according to any one of the items to [13], wherein the step (S) includes regulating a blending ratio [(A)/(B)] of the alkyl (meth)acrylate (A) and the hydroxy group-containing (meth)acrylate (B) in terms of molar ratio to 20/80 to 80/20.

[15] The method for producing a lubricating oil additive composition according to any one of the items to [14], wherein the step (5) includes regulating a blending ratio [(C)/{(A)+(B)}] of the phosphorus-containing (meth)acrylate (C) and the total amount of the alkyl (meth)acrylate (A) and the hydroxy group-containing (meth)acrylate (B) in terms of molar ratio to 0.1/100 to 10/100.

EXAMPLES

The present invention will be described more specifically with reference to examples below, but the present invention is not limited to the following examples.
[Measurement Methods of Property Values]
The properties of the raw materials used in Examples and Comparative Examples and the lubricating oil compositions of Examples and Comparative Examples were measured according to the following procedures.
(1) Kinematic Viscosity and Viscosity Index
The kinematic viscosity at 40° C., the kinematic viscosity at 100° C., and the viscosity index of the lubricating oil composition were measured or calculated according to JIS K2283:2000.

(2) Phosphorus Amount
The phosphorus amount of the lubricating oil composition was measured according to JPI-5S-38-03.
The phosphorus content of the lubricating oil additive composition was calculated based on the result obtained by measuring the phosphorus amount in the lubricating oil composition according to JPI-5S-38-03 and the amount of the lubricating oil additive composition added to the lubricating oil composition (dissolved amount).
(3) Mass Average Molecular Weight (Mw) and Molecular Weight Distribution (Mw/Mn)
One column of "TSKguardcolumn Super HZ-L" and two columns of "TSKSuperMultipore HZ-M", all produced by Tosoh Corporation, were mounted on "1515 Isocratic HPLC Pump" and "2414 Differential Refractive Index (RI) Detector", both produced by Waters Corporation, in this order from the upstream side, and the molecular weight was measured under conditions of a measurement temperature of 40° C., tetrahydrofuran as the mobile phase, a flow rate of 0.35 mL/min, and a sample concentration of 1.0 mg/mL, and obtained as a standard polystyrene conversion value.

Examples 1 to 6 and Comparative Examples 1 to 6

The lubricant base oil and the lubricating oil additive compositions shown below were sufficiently mixed at the blending amounts (% by mass) shown in Table 1, so as to prepare lubricating oil compositions of Examples 1 to 6 and Comparative Examples 1 to 6.
The details of the lubricant base oils and the lubricating oil additive compositions used in Examples 1 to 6 and Comparative Examples 1 to 6 are as follows.
<Lubricant Base Oil>
Mineral oil (150 N) classified into Group II of the API Classification
<Lubricating Oil Additive Compositions>
Poly(meth)acrylate-based copolymer (X)-1: produced by the method described in Production Example 1
Poly(meth)acrylate-based copolymer (X)-2: produced by the method described in Production Example 2
Poly(meth)acrylate-based copolymer (X)-3: produced by the method described in Production Example 3
Poly(meth)acrylate-based copolymer (X')-1: produced by the method described in Comparative Production Example 1
Poly(meth)acrylate-based copolymer (X')-2: produced by the method described in Comparative Production Example 2
Hydrogen phosphonate (P amount: 5.34% by mass)
Acid phosphate (P amount: 6.3% by mass)
Triaryl phosphate (P amount: 8.30% by mass)

Production Examples 1 to 3 and Comparative Production Examples 1 and 2

(Monomers Used in Production Examples 1 to 3)
"Dodecyl acrylate" is a compound represented by the general formula (a-1), wherein $R^{a1}$ represents a hydrogen atom, and $R^{a2}$ represents a dodecyl group (i.e., an alkyl group having 12 carbon atoms). The compound was used as the alkyl (meth)acrylate (A).
"2-Hydroxyethyl acrylate" is a compound represented by the general formula (b-1), wherein $R^{b1}$ represents a hydrogen atom, $R^{b2}$ represents an ethylene group (i.e., an alkylene group having 2 carbon atoms), and m1=1. The compound was used as the hydroxy group-containing (meth)acrylate (B).

"P-1A(N)" produced by Kyoeisha Chemical Co., Ltd., having a phosphorus content of 14.3% by mass, is a mixture containing a compound represented by the general formula (c-1), wherein n=1, as a major component, and also containing a compound represented by the same general formula, wherein n=2. In both the compounds, $R^{c1}$ represents a hydrogen atom, and m2=1. In both the compounds, $R^{c3}$ represents a hydrogen atom. The material was used as the phosphorus-containing (meth)acrylate (C).

The acid value of P-1A(N) (which was a value measured by the potentiometric method defined in JIS K2501:2003-7) was 420 to 520 mgKOH/g.

(Monomers used in Comparative Production Examples 1 and 2)

"P-1M" produced by Kyoeisha Chemical Co., Ltd., having a phosphorus content of 14.7% by mass, is a mixture containing a compound represented by the general formula (c-1), wherein n=1, as a major component, and also containing a compound represented by the same general formula, wherein n=2. In both the compounds, $R^{c1}$ represents a methyl group, and m2=1. In both the compounds, $R^{c3}$ represents a hydrogen atom.

"Methyl methacrylate" is a compound represented by the general formula (a-1), wherein $R^{a1}$ represents a methyl group, and $R^{a2}$ represents a methyl group.

"Dodecyl methacrylate" is a compound represented by the general formula (a-1), wherein $R^{a1}$ represents a methyl group, and $R^{a2}$ represents a dodecyl group.

"Tetradecyl methacrylate" is a compound represented by the general formula (a-1), wherein $R^{a1}$ represents a methyl group, and $R^{a2}$ represents a tetradecyl group.

"Glycidyl methacrylate" is a compound having the following structure.

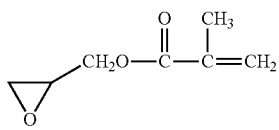

Production Example 1: Production of Poly(Meth)Acrylate-Based Copolymer (X)-1

In a four-neck flask having a capacity of 200 mL equipped with a thermometer, a nitrogen introducing tube, and an agitator, 36 g (150 mmol) of dodecyl acrylate, 11.5 g (99 mmol) of 2-hydroxyethyl acrylate, 0.944 g (4.8 mmol) of P-1A(N), and 47.6 g of 2-propanol as a solvent were charged.

Subsequently, after purging the flask with nitrogen, 0.2 g of 2,2'-azobis(isobutyronitrile) was added as an initiator, then the temperature was gradually increased under agitation, the reaction was performed at a temperature of 75 to 85° C. for 4 hours under refluxing, and after completing the reaction, the solvent was distilled off under reduced pressure to provide a poly(meth)acrylate-based copolymer (X)-1.

The poly(meth)acrylate-based copolymer (X)-1 had a mass average molecular weight (Mw) of 18,200 and a molecular weight distribution (Mw/Mn) of 2.1. The poly(meth)acrylate-based copolymer (X)-1 had a phosphorus content of by mass.

The poly(meth)acrylate-based copolymer (X)-1 was diluted with a mineral oil to make a content of the poly(meth)acrylate-based copolymer (X)-1 of 50% by mass, and mixed with a lubricant base oil.

Production Example 2: Production of Poly(meth)acrylate-based Copolymer (X)-2

A poly(meth)acrylate-based copolymer (X)-2 was obtained by performing the same operation as in Production Example 1 except that 95.2 g of 2-propanol was charged as a solvent.

The poly(meth)acrylate-based copolymer (X)-2 had a mass average molecular weight (Mw) of 11,500 and a molecular weight distribution (Mw/Mn) of 1.9. The poly(meth)acrylate-based copolymer (X)-2 had a phosphorus content of 0.25% by mass.

The poly(meth)acrylate-based copolymer (X)-2 was diluted with a mineral oil to make a content of the poly(meth)acrylate-based copolymer (X)-2 of 50% by mass, and mixed with a lubricant base oil.

Production Example 3: Production of Poly(Meth)Acrylate-Based Copolymer (X)-3

A poly(meth)acrylate-based copolymer (X)-3 was obtained by performing the same operation as in Production Example 1 except that 23.8 g of 2-propanol was charged as a solvent.

The poly(meth)acrylate-based copolymer (X)-3 had a mass average molecular weight (Mw) of 31,900 and a molecular weight distribution (Mw/Mn) of 2.6. The poly(meth)acrylate-based copolymer (X)-3 had a phosphorus content of by mass.

The poly(meth)acrylate-based copolymer (X)-3 was diluted with a mineral oil to make a content of the poly(meth)acrylate-based copolymer (X)-3 of 50% by mass, and mixed with a lubricant base oil.

Comparative Production Example 1: Production of Poly(Meth)Acrylate-Based Copolymer 00-1

In a four-neck flask having a capacity of 200 mL equipped with a thermometer, a nitrogen introducing tube, and an agitator, 8.5 g (84.9 mmol) of methyl methacrylate, 25.0 g (98.3 mmol) of dodecyl methacrylate, 15.0 g (53.1 mmol) of tetradecyl methacrylate, 1.5 g (7.1 mmol) of P-1M, 0.5 g (2.5 mmol) of dodecylmercaptan as a chain transfer agent, and 17.5 g of 2-propanol as a solvent were charged.

Subsequently, after purging the flask with nitrogen, 0.25 g of 2,2'-azobis(2,4-dimethylvaleronitrile) was added as an initiator, then the temperature was gradually increased under agitation, the reaction was performed at a temperature of 75 to 85° C. for 4 hours under refluxing, and after completing the reaction, the solvent was distilled off under reduced pressure to provide a poly(meth)acrylate-based copolymer (X')-1.

The poly(meth)acrylate-based copolymer (X')-1 had a mass average molecular weight (Mw) of 24,500 and a molecular weight distribution (Mw/Mn) of 1.8. The poly(meth)acrylate-based copolymer 00-1 had a phosphorus content of 0.44% by mass.

The poly(meth)acrylate-based copolymer (X')-1 was diluted with a mineral oil to make a content of the poly(meth)acrylate-based copolymer (X')-1 of 50% by mass, and mixed with a lubricant base oil.

Comparative Production Example 2: Production of Poly(Meth)Acrylate-Based Copolymer (X')-2

In a four-neck flask having a capacity of 200 mL equipped with a thermometer, a nitrogen introducing tube, and an agitator, 1.6 g (11.3 mmol) of glycidyl methacrylate, 37.4 g (147.1 mmol) of dodecyl methacrylate, 0.35 g (1.7 mmol) of dodecylmercaptan as a chain transfer agent, and 16.9 g of a mineral oil as a solvent were charged.

Subsequently, after purging the flask with nitrogen, 0.22 g of 2,2'-azobis(isobutyronitrile) was added as an initiator, then the temperature was gradually increased under agitation, and the reaction was performed at a temperature of 75 to 85° C. for 7 hours under refluxing. After cooling to room temperature, 2.49 g (11.9 mmol) of dibutyl phosphate and 24.9 g of a mineral oil as a solvent were added, then the temperature was gradually increased under agitation, and the reaction was performed at a temperature of 80 to 100° C. for 10 hours under refluxing, so as to provide a poly(meth) acrylate-based copolymer (X')-2 (diluted to 50% by mass with a mineral oil).

The poly(meth)acrylate-based copolymer (X')-2 had a mass average molecular weight (Mw) of 26,800 and a molecular weight distribution (Mw/Mn) of 1.8. The poly (meth)acrylate-based copolymer (X')-2 had a phosphorus content of 0.86% by mass.

The poly(meth)acrylate-based copolymer (X')-2 was mixed with a lubricant base oil in the state diluted with the diluting solvent used in the polymerization (i.e., the state diluted to 50% by mass with a mineral oil).

[Evaluation Methods]

The tests described below were performed for evaluating the wear resistance, the extreme pressure property, and the thermal stability.

<Shell Wear Test>

The wear resistance of the lubricating oil composition was evaluated with a shell wear tester according to ASTM D4172 under test conditions set to a load of 30 kg, a rotation number of 1,200 rpm, a temperature of 80° C., and a test time of 30 minutes. The results are shown in terms of wear track diameter (mm) of the test hard sphere.

In this test, a case with a wear track diameter of 0.50 mm or less was judged as good wear resistance.

<Shell Four-Ball Load Bearing (EP) Test>

The last non-seizure load (LNL) and the weld load (WL) were measured with a four-ball tester according to ASTM D2783-03 (2014) under conditions of a rotation number of 1,800 rpm and an oil temperature (room temperature: 25±5° C.). Larger values thereof mean better extreme pressure property.

In this test, a case with a last non-seizure load (LNL) of 490 N or more and a weld load (WL) of 1,569 or more was judged as good extreme pressure property.

<ISOT Test>

Pieces and iron pieces were placed as a catalyst in a test oil (lubricating oil composition), and the test oil was forcedly deteriorated by performing the ISOT test according to JIS K2514-1:2013. The test temperature (oil temperature) was 150° C. The test oil after 24 hours from the start of the ISOT test was measured for the sludge amount (mg/100 mL) according to JIS B9931.

A case of "none" in the following evaluation standard was judged as good thermal stability.

"none": sludge amount of less than 5.0 mg/100 mL
"small": sludge amount of 5.0 mg/100 mL or more and less than 20.0 mg/100 mL
"medium": sludge amount of 20.0 mg/100 mL or more and less than 40.0 mg/100 mL
"large": sludge amount of 40.0 mg/100 mL or more The results are shown in Table 1. In Table 1, the numeral in parentheses in the content of the lubricating oil additive composition means the content in terms of resin content.

TABLE 1

| | | | | Example 1 | Example 2 | Example 3 | Example 4 | Example 5 | Example 6 |
|---|---|---|---|---|---|---|---|---|---|
| Composition of lubricating oil composition | Lubricant base oil | 150N Mineral oil (Gr. II) | % by mass | 93.45 | 96.69 | 93.45 | 96.73 | 93.45 | 96.73 |
| | Lubricating oil additive composition | Poly(meth)acrylate-based copolymer (X)-1 | % by mass | 6.55 (3.23) | 3.31 (1.65) | — | — | — | — |
| | | Poly(meth)acrylate-based copolymer (X)-2 | % by mass | — | — | 6.55 (3.23) | 3.27 (1.64) | — | — |
| | | Poly(meth)acrylate-based copolymer (X)-3 | % by mass | — | — | — | — | 6.55 (3.23) | 3.27 (1.64) |
| | | Hydrogen phosphate | % by mass | — | — | — | — | — | — |
| | | Acid phosphate | % by mass | — | — | — | — | — | — |
| | | Triaryl phosphate | % by mass | — | — | — | — | — | — |
| | | Poly(meth)acrylate-based copolymer (X')-1 | % by mass | — | — | — | — | — | — |
| | | Poly(meth)acrylate-based copolymer (X')-2 | % by mass | — | — | — | — | — | — |
| Properties of lubricating oil composition | P amount | | ppm by mass | 100 | 50 | 100 | 50 | 100 | 50 |
| | Kinematic viscosity at 40° C. | | mm$^2$/s | 32.6 | 31.7 | 32.1 | 31.6 | 34.0 | 32.4 |
| | Kinematic viscosity at 100° C. | | mm$^2$/s | 5.74 | 5.54 | 5.61 | 5.53 | 5.99 | 5.69 |
| | Viscosity index | | — | 118 | 113 | 114 | 112 | 122 | 116 |
| Evaluation results | Wear track diameter | | mm | 0.41 | 0.42 | 0.43 | 0.40 | 0.42 | 0.39 |
| | LNL (last non-seizure load) (shell four-ball load bearing (EP) test) | | N | 981 | 785 | 981 | 490 | 981 | 981 |
| | WL (weld load) (shell four-ball load bearing (EP) test) | | N | 1961 | 1569 | 1961 | 1569 | 1961 | 1569 |
| | Sludge amount after ISOT | | — | none | none | none | none | none | none |

TABLE 1-continued

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Composition of lubricating oil composition | Lubricant base oil | 150N Mineral oil (Gr. II) | % by mass | 99.81 | 99.84 | 99.53 | 99.88 | 95.43 | 97.62 |
|  | Lubricating oil additive composition | Poly(meth)acrylate-based copolymer (X)-1 | % by mass | — | — | — | — | — | — |
|  |  | Poly(meth)acrylate-based copolymer (X)-2 | % by mass | — | — | — | — | — | — |
|  |  | Poly(meth)acrylate-based copolymer (X)-3 | % by mass | — | — | — | — | — | — |
|  |  | Hydrogen phosphate | % by mass | 0.19 | — | — | — | — | — |
|  |  | Acid phosphate | % by mass | — | 0.16 | 0.47 | — | — | — |
|  |  | Triaryl phosphate | % by mass | — | — | — | 0.12 | — | — |
|  |  | Poly(meth)acrylate-based copolymer (X')-1 | % by mass | — | — | — | — | 4.54 (2.27) | — |
|  |  | Poly(meth)acrylate-based copolymer (X')-2 | % by mass | — | — | — | — | — | 2.38 (1.19) |
| Properties of lubricating oil composition | P amount |  | ppm by mass | 100 | 100 | 300 | 100 | 100 | 100 |
|  | Kinematic viscosity at 40° C. |  | mm$^2$/s | 31.1 | 31.2 | 31.1 | 31.1 | 33.2 | 33.1 |
|  | Kinematic viscosity at 100° C. |  | mm$^2$/s | 5.38 | 5.39 | 5.40 | 5.38 | 5.96 | 5.78 |
|  | Viscosity index |  | — | 107 | 107 | 108 | 107 | 126 | 117 |
| Evaluation results | Wear track diameter |  | mm | 0.71 | 0.83 | 0.38 | 0.59 | 0.41 | 0.41 |
|  | LNL (last non-seizure load) (shell four-ball load bearing (EP) test) |  | N | 490 | 618 | 785 | 392 | 618 | 618 |
|  | WL (weld load) (shell four-ball load bearing (EP) test) |  | N | 1236 | 981 | 1569 | 981 | 1569 | 1236 |
|  | Sludge amount after ISOT |  | — | — | large | medium | large | none | small | none |

The following matters are understood from Table 1.

It is understood from the results shown by Examples 1 to 6 that the lubricating oil composition blended with the poly(meth)acrylate-based copolymer (X)-1, the poly(meth)acrylate-based copolymer (X)-2, or the poly(meth)acrylate-based copolymer (X)-3 is excellent in wear resistance, extreme pressure property, and thermal stability.

It is understood from the results shown by Comparative Example 1 that the lubricating oil composition blended with the hydrogen phosphonate, which is a low molecular weight phosphorus-based compound, is insufficient in all wear resistance, extreme pressure property, and thermal stability.

It is understood from the results shown by Comparative Examples 2 and 3 that the lubricating oil composition blended with the acid phosphate, which is a low molecular weight phosphorus-based compound, secures the wear resistance and the extreme pressure property by increasing the amount of the acid phosphate blended, but is insufficient in thermal stability.

It is understood from the results shown by Comparative Example 4 that the lubricating oil composition blended with the triaryl phosphate, which is a low molecular weight phosphorus-based compound, is in sufficient in wear resistance and extreme pressure property.

It is understood from the results shown by Comparative Example 5 that the lubricating oil composition blended with the poly(meth)acrylate-based copolymer (X')-1 is good in wear resistance and extreme pressure property, but is insufficient in thermal stability.

It is understood from the results shown by Comparative Example 6 that the lubricating oil composition blended with the poly(meth)acrylate-based copolymer (X')-2 is good in wear resistance and thermal stability, but is insufficient in extreme pressure property.

The invention claimed is:

1. A lubricating oil additive composition comprising a poly(meth)acrylate-based copolymer (X) containing a structural unit (a) derived from an alkyl (meth)acrylate (A) represented by the following general formula (a-1), a structural unit (b) derived from a hydroxy group-containing (meth)acrylate (B) represented by the following general formula (b-1), and a structural unit (c) derived from a phosphorus-containing (meth)acrylate (C) represented by the following general formula (c-1):

(a-1)

wherein in the general formula (a-1), $R^{a1}$ represents a hydrogen atom or a methyl group; and $R^{a2}$ represents an alkyl group having 8 to 20 carbon atoms,

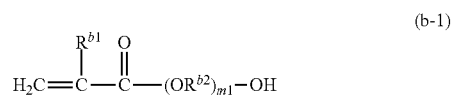

(b-1)

wherein in the general formula (b-1), $R^{b1}$ represents a hydrogen atom or a methyl group; $R^{b2}$ represents an alkylene group having 2 to 4 carbon atoms; and m1 represents an integer of 1 to 10, in which in the case where m1 represents an integer of 2 or more, plural groups represented by $R^{b2}$ may be the same as or different from each other,

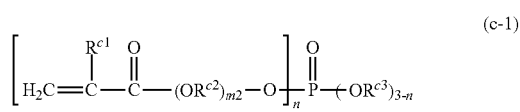

(c-1)

wherein in the general formula (c-1), $R^{c1}$ represents a hydrogen atom or a methyl group; $R^{c2}$ represents an ethylene group; m2 represents an integer of 1 to 6, in which in the case where m2 represents an integer of 2 or more, plural groups represented by $R^{c2}$ may be the same as or different from each other; n represents an integer of 1 or 2; and in the case where n=1, at least one of plural groups represented by $R^{c3}$ is a hydrogen atom, and in the case where n=2, $R^{c3}$ represents a hydrogen atom.

2. The lubricating oil additive composition according to claim 1, wherein in the general formula (c-1), in the case where n=1, one of plural groups represented by $R^{c3}$ is a hydrogen atom, and the other one is a methyl group or an ethyl group.

3. The lubricating oil additive composition according to claim 1, wherein in the general formula (c-1), in the case where n=1, plural groups represented by $R^{c3}$ are all hydrogen atoms.

4. The lubricating oil additive composition according to claim 1, wherein the poly(meth)acrylate-based copolymer (X) satisfies the following condition (α):
<Condition (α)>
a content ratio [(a)/(b)] of the structural unit (a) and the structural unit (b) in terms of molar ratio of 20/80 to 80/20.

5. The lubricating oil additive composition according to claim 1, wherein the poly(meth)acrylate-based copolymer (X) satisfies the following condition (β):
<Condition (β)>
a phosphorus content of the poly(meth)acrylate-based copolymer (X) of 0.05% by mass or more and 1.0% by mass or less based on the total amount of the poly (meth)acrylate-based copolymer (X).

6. The lubricating oil additive composition according to claim 1, wherein the poly(meth)acrylate-based copolymer (X) has a mass average molecular weight (Mw) of 5,000 to 100,000.

7. The lubricating oil additive composition according to claim 1, wherein the phosphorus-containing (meth)acrylate (C) has an acid value of 300 mgKOH/g to 600 mgKOH/g.

8. The lubricating oil additive composition according to claim 1, wherein the lubricating oil additive composition is suitable as a load bearing additive.

9. A lubricating oil composition comprising the lubricating oil additive composition according to claim 1 and a lubricant base oil.

10. A method for producing a lubricating oil additive composition, comprising producing a poly(meth)acrylate-based copolymer (X) by polymerizing an alkyl (meth) acrylate (A) represented by the following general formula (a-1), a hydroxy group-containing (meth)acrylate (B) represented by the following general formula (b-1), and a phosphorus-containing (meth)acrylate (C) represented by the following general formula (c-1):

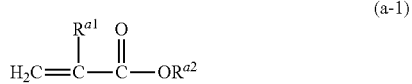
(a-1)

wherein in the general formula (a-1), $R^{a1}$ represents a hydrogen atom or a methyl group; and $R^{a2}$ represents an alkyl group having 8 to 20 carbon atoms,

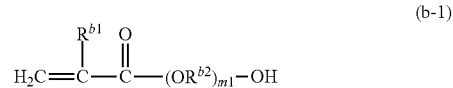
(b-1)

wherein in the general formula (b-1), $R^{b1}$ represents a hydrogen atom or a methyl group; $R^{b2}$ represents an alkylene group having 2 to 4 carbon atoms; and m1 represents an integer of 1 to 10, in which in the case where m1 represents an integer of 2 or more, plural groups represented by $R^{b2}$ may be the same as or different from each other,

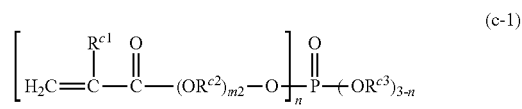
(c-1)

wherein in the general formula (c-1), $R^{c1}$ represents a hydrogen atom or a methyl group; $R^{c2}$ represents an ethylene group; m2 represents an integer of 1 to 6, in which in the case where m2 represents an integer of 2 or more, plural groups represented by $R^{c2}$ may be the same as or different from each other; n represents an integer of 1 or 2; and in the case where n=1, at least one of plural groups represented by $R^{c3}$ is a hydrogen atom, and in the case where n=2, $R^{c3}$ represents a hydrogen atom.

11. The method for producing a lubricating oil additive composition according to claim 10, wherein in the general formula (c-1), in the case where n=1, one of plural groups represented by $R^{c3}$ is a hydrogen atom, and the other one is a methyl group or an ethyl group.

12. The method for producing a lubricating oil additive composition according to claim 10, wherein in the general formula (c-1), in the case where n=1, plural groups represented by $R^{c3}$ are all hydrogen atoms.

13. The method for producing a lubricating oil additive composition according to claim 10, wherein the producing includes regulating a blending ratio [(A)/(B)] of the alkyl (meth)acrylate (A) and the hydroxy group-containing (meth) acrylate (B) in terms of molar ratio to 20/80 to 80/20.

14. The method for producing a lubricating oil additive composition according to claim 10, wherein the producing includes regulating a blending ratio [(C)/{(A)+ (B)}] of the phosphorus-containing (meth)acrylate (C) and the total amount of the alkyl (meth)acrylate (A) and the hydroxy group-containing (meth)acrylate (B) in terms of molar ratio to 0.1/100 to 10/100.

\* \* \* \* \*